United States Patent
Jinno et al.

(10) Patent No.: US 6,171,644 B1
(45) Date of Patent: *Jan. 9, 2001

(54) ELECTRONIC COMPONENT AND METHOD OF MANUFACTURE THEREFOR

(75) Inventors: Riho Jinno, Moriguchi; Kazuyuki Nakamura, Eniwa, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/296,537

(22) Filed: Apr. 22, 1999

Related U.S. Application Data

(62) Division of application No. 08/930,440, filed on Sep. 16, 1997.

(30) Foreign Application Priority Data

Jan. 24, 1996 (JP) .................................................. 8-009773

(51) Int. Cl.[7] ...................................................... B05D 5/12
(52) U.S. Cl. ............................ 427/79; 427/102; 427/103; 427/126.3; 29/25.41; 29/610.1; 29/613; 29/620
(58) Field of Search ................................... 427/79, 126.3, 427/102, 103; 29/25.41, 610.1, 613, 620

(56) References Cited

U.S. PATENT DOCUMENTS

| | | | |
|---|---|---|---|
| 5,614,074 | 3/1997 | Ravindranathan | 205/50 |
| 5,866,196 | * 2/1999 | Ueno et al. | 427/79 |

FOREIGN PATENT DOCUMENTS

| | | |
|---|---|---|
| 2-007401 | 1/1990 | (JP) . |
| 240202 | * 10/1991 | (JP) . |
| 3-240202 | 10/1991 | (JP) . |
| 4-127401 | 4/1992 | (JP) . |
| 308003 | * 11/1993 | (JP) . |
| 5-308003 | 11/1993 | (JP) . |
| 6-295803 | 10/1994 | (JP) . |
| 7-66006 | 3/1995 | (JP) . |
| 7-201533 | 8/1995 | (JP) . |

* cited by examiner

Primary Examiner—Brian K. Talbot
(74) Attorney, Agent, or Firm—McDermott, Will & Emery

(57) ABSTRACT

The present invention aims to present an electronic component which is free from the fear of sneaking-in of water etc. from the edge of electrode, by covering the electrode edge with resin. For the purpose, external electrodes (3) are formed at both ends of varistor (1) comprised of ceramic sheet (1a) and internal electrode (2) laminated alternately, and then, a within-the-surface insulation layer (30) is formed by covering the porous surface inside the varistor (1), or filling the Porosity, with silicone resin, and an outside-the-surface insulation layer (31) is formed covering the surface of varistor (1) and the edge of external electrode (3).

10 Claims, 7 Drawing Sheets

ELECTRONIC COMPONENT AND METHOD OF MANUFACTURE THEREFOR

This is a Divisional of U.S. patent application Ser. No. 08/930,440, filed Sep. 16, 1997 still pending.

TECHNICAL FIELD

The present invention relates to electronic components such as a multilayer varistor etc., and a method of manufacturing the same.

BACKGROUND ART

A conventional electronic component having at least a pair of electrodes on the surface of body is impregnated with resin on the surface only in an area where the electrodes are not formed.

The water-resisting quality may be improved by the resin impregnated in the body. However, there is a problem in the above described structure that the water etc. sneaks into through the edge of electrode causing deteriorated characteristics.

DISCLOSURE OF THE INVENTION

The present invention aims to present an electronic component with which the sneaking of water etc. through the electrode edge is prevented by covering the electrode edge with an insulating layer.

An electronic component according to the present invention comprises a body, at least a pair of electrodes formed on the surface of the body at a specified gap, and an insulation layer provided for covering the surface of the body in an area where the electrodes are not formed and the edge of the electrode, wherein at least a part of the insulation layer is formed by impregnating an insulation material into within-the-surface of the body. With the above described structure in which an insulation layer provided on the surface covers the edge of electrodes, peeling-off at the edge of electrode is prevented, at the same time the sneaking of water through the electrode edge is also avoided.

BEST MODE FOR CARRYING OUT THE INVENTION

In the following, an electronic component according to the present invention and a method of manufacturing the same is described in detail referring to drawings.

Figure 1:
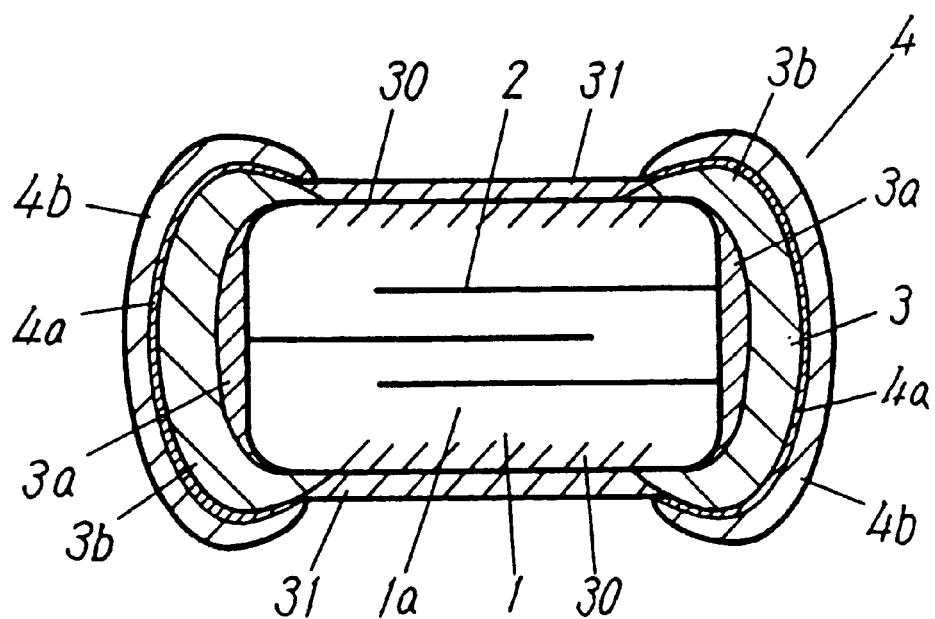
FIG. 1 is a cross sectional view showing a multilayer varistor according to an embodiment of the present invention.

As shown in FIG. 1, there are plural internal electrodes 2 made mainly of nickel (Ni), inside varistor 1. These internal electrodes 2 are alternately pulled out to respective ends of varistor 1 to be electrically connected with external electrodes 3. The external electrode 3 is comprised of at least two layers; an inner layer 3a is made mainly of Ni, an outer layer 3b is made mainly of silver (Ag). A ceramic sheet 1a existing between and outside the internal electrodes 2 is made mainly of $SrTiO_2$, containing $Nb_2O_5$, $SiO_2$ etc. as subordinate component. A within-the-surface insulation layer 30 is a layer formed by covering the porous surface inside the varistor 1 or filling the pore with silicone resin. An outside-the-surface insulation layer 31 is a layer of silicone resin covering the edge of external electrode 3. On the surface of external electrode 3 is a layer of plating 4, comprised of Ni layer 4a and solder layer 4b.

Figure 2:
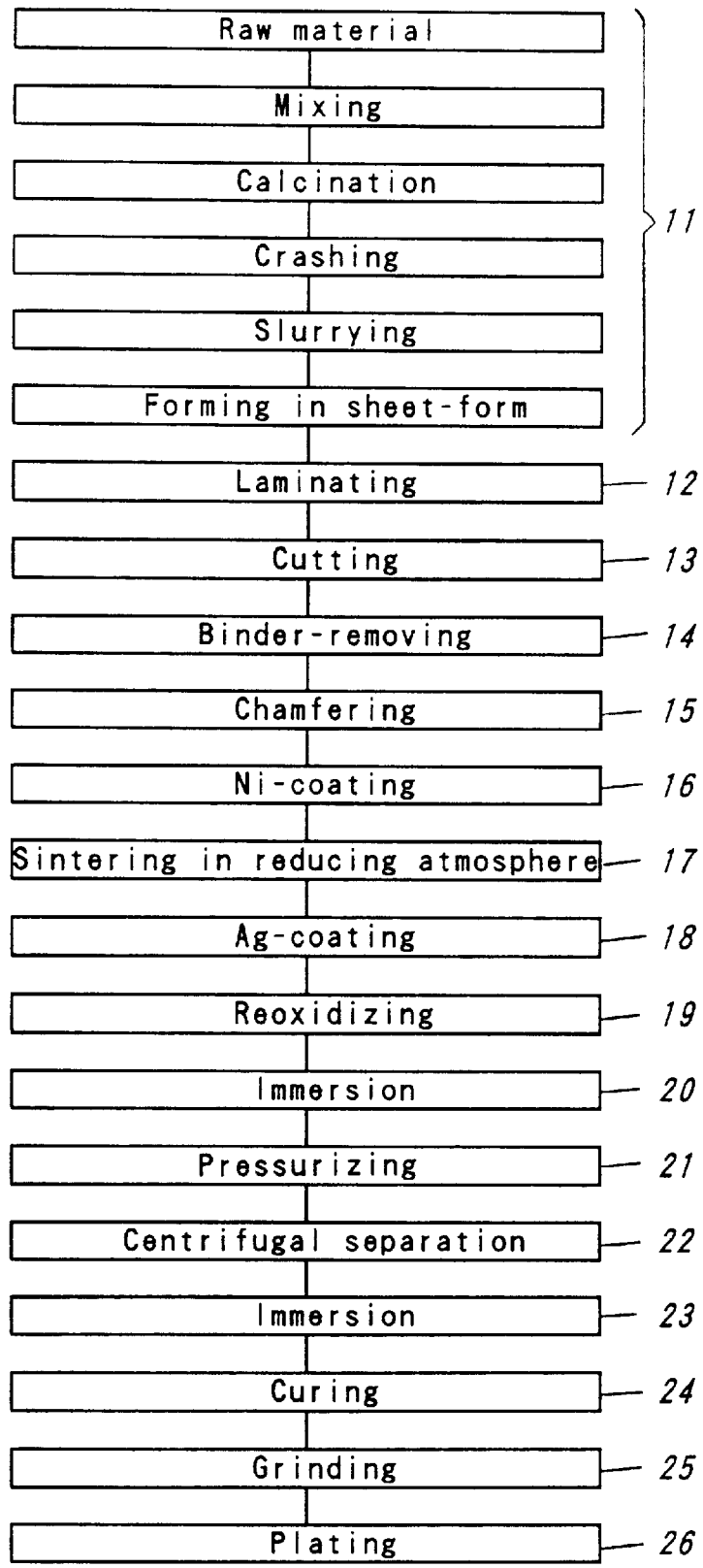
FIG. 2 is a chart showing manufacturing process steps of a multilayer varistor according to an embodiment of the present invention.

As shown in FIG. 2, the ceramic sheet 1a is manufactured through the process (11); mixing of raw materials, calcination, crashing, slurrying and forming in a sheet form. The ceramic sheet 1a and internal electrodes 2 are laminated (12), cut (13), binder is removed (14), chamfered (15), and the edge is curved. Inner layer 3a of external electrode 3 is formed through coating (16) and sintering (17) at 1200–1300° C. in reducing atmosphere. Then, outer layer 3b is formed through coating (18) and heating (19) at 800–850° C. for reoxidizing. A completely dried varistor 1 is immersed (20) in silicone varnish containing 75% toluene as resolvent to have the varistor 1 impregnated with silicone varnish.

Figure 3:
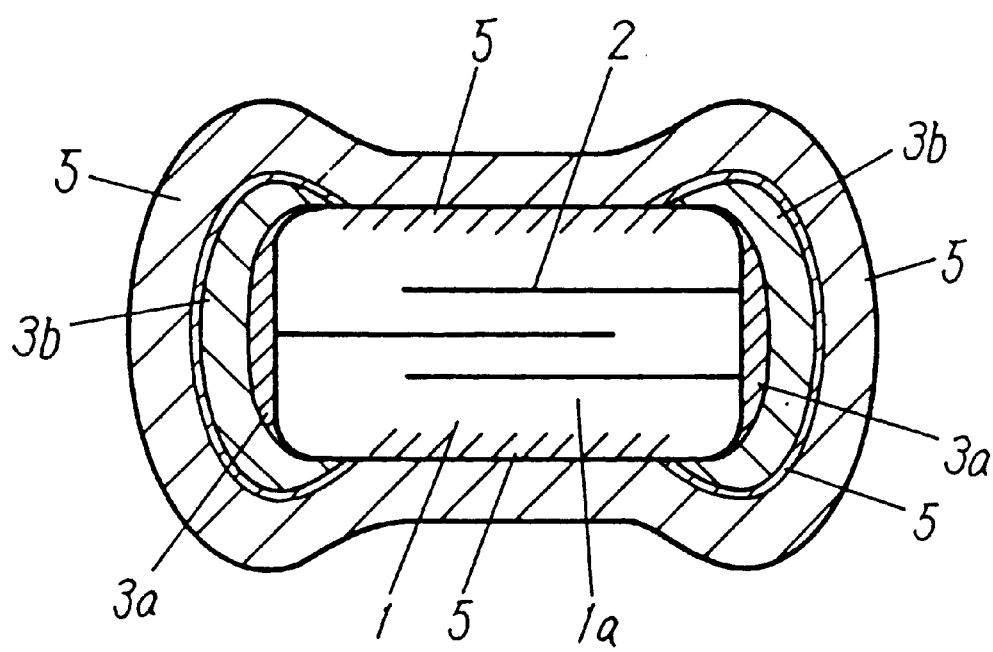
FIG. 3 is a cross sectional view showing a varistor after silicone varnish impregnation according to an embodiment of the present invention.

Varistor 1 is pressurized (21) by 6–1500 kg/cm² for e.g. 2 minutes while being immersed in the silicone varnish in order to have the varistor 1 impregnated further with the silicone varnish, and then restored to the normal atmospheric pressure, at which the multilayer varistor is put on service. The varistor 1 at this stage is covered thick with silicone varnish 5 for the entire surface, with the vaistor 1 and the external electrodes 3 impregnated with silicone varnish 5, as shown in FIG. 3. The pressurizing force may be determined according to the density of varistor 1; namely, varistor 1 of a higher density may be pressurized with a higher force for the easier impregnation. In the case of a varistor whose main component is ZnO, the density of which is high and the pressurizing force may be raised to 500–1500 kg/cm₂.

Figure 4:
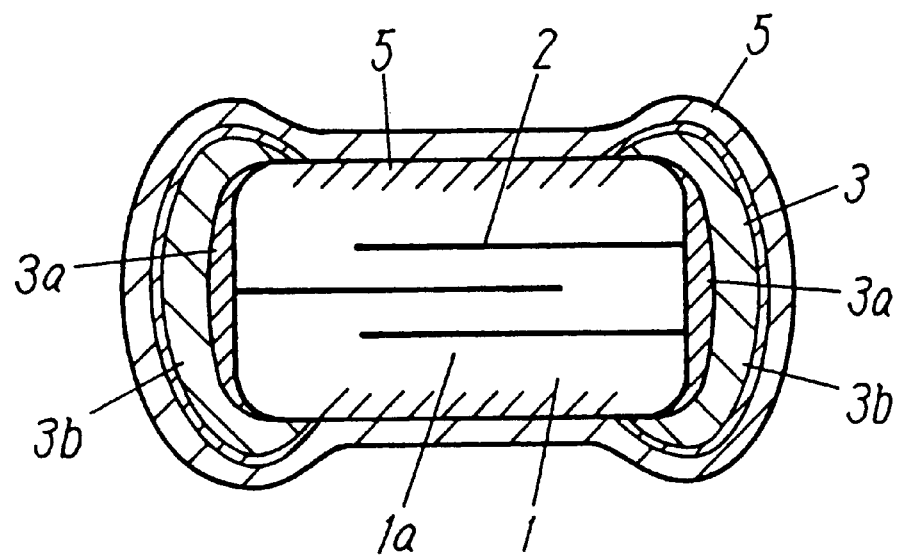
FIG. 4 is a cross sectional view showing a varistor after centrifugal processing according to an embodiment of the present invention.
Figure 5:
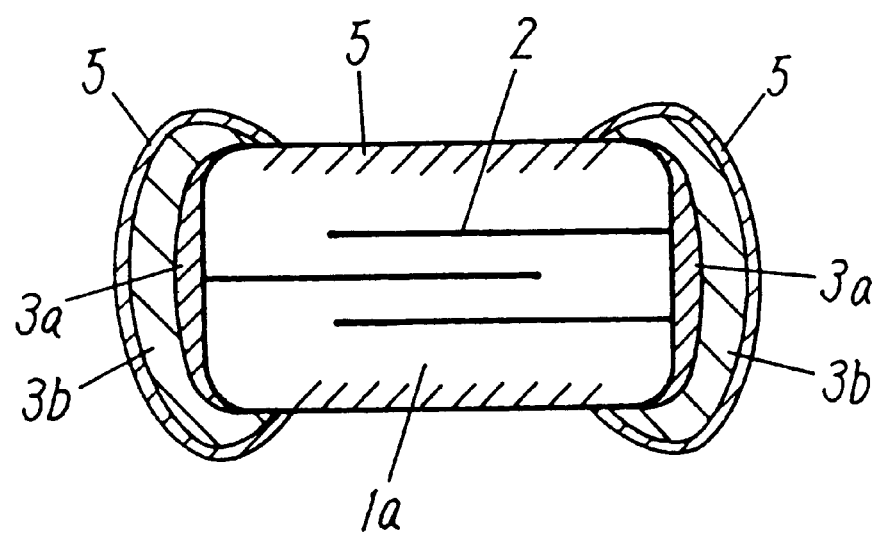
FIG. 5 is a cross sectional view showing a varistor after toluene impregnation according to an embodiment of the present invention.

The varistor 1 is taken out of the silicone varnish, and put into a metal basket (or metal net etc.) to be set on a centrifugal separator having inner diameter of e.g. 60 cm running at 500–1500 r/min. (22 in FIG. 2) for removing most portion of unnecessary silicone varnish sticking on the surface of varistor 1, as shown in FIG. 4. Then, the metal basket containing the varistor is immersed in toluene (23), vibrated for 5–60 sec., taken out, and quickly heated at e.g, 60° C. for removing the toluene sticking on the surface of varistor 1, as shown in FIG. 5. Instead of immersing in toluene, varistor 1 may be taken out of the metal basket to be put in $SiO_2$ powder, which is inert to the silicone varnish, to have unnecessary silicone varnish 5 sticking on the surface of varistor 1 absorbed, and then separating the varistor 1 using a sieve or such other devices. Through the above described procedure, unnecessary portion of silicone varnish 5 sticking on the surface of varistor 1 is removed.

Figure 6:
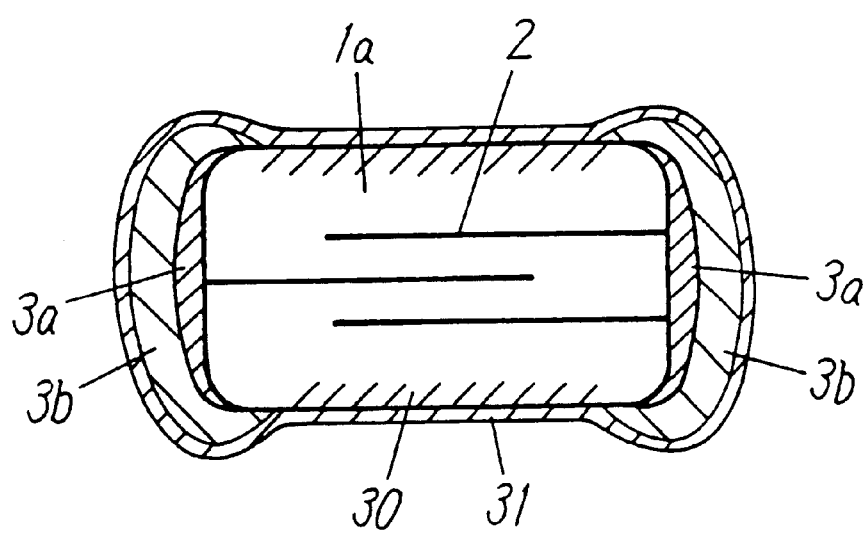
FIG. 6 is a cross sectional view showing a varistor after silicone resin curing according to an embodiment of the present invention.
Figure 7:
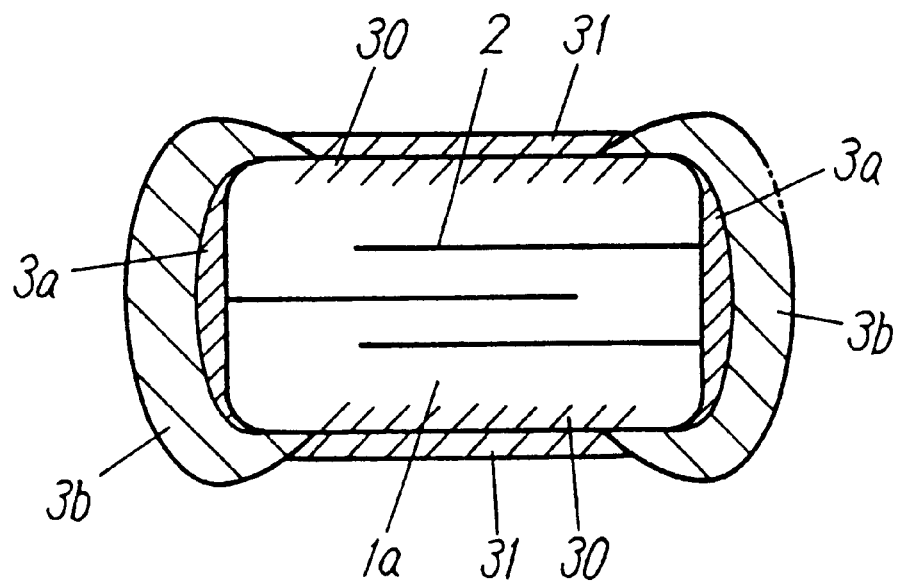
FIG. 7 is a cross sectional view showing a varistor after grinding according to an embodiment of the present invention.

And then, varistor 1 is put on a metal net to be heated at a temperature (approximately 125–200° C.) higher than the curing temperature of silicone resin contained in the silicone varnish 5 for curing (24) the silicone resin. When, a part of the silicone resin impregnated within external electrodes 3 and inside of varistor 1 is separated out to cover the surface, and a varistor 1 as shown in FIG. 6 is obtained. After this, varistor 1 is put into a container of e.g. polyethylene together with an abrasive of SiO and water, the container sealed, and provided with mechanical movement such as revolution, vibration etc. for grinding (25) the surface, in order to remove the silicone resin covering the surface of external electrodes 3 to a degree so as plating and other succeeding process steps are not ill-affected. During the surface grinding (25), the silicone resin on the surface of external electrodes 3 is selectively removed by a mechanical stress given to varistor 1 due to a fact that the adhesion strength of silicone resin after curing is stronger with respect to varistor 1 than with the surface of external electrode 3. Some of the silicone resin may remain in the inner surface of external electrode 3, the electrical contact of external electrode 3 is not affected by the silicone resin.

The surface of external electrode 3 of varistor 1 is plated (26) to obtain a multilayer varistor as illustrated in FIG. 1.

As described in the above, a multilayer varistor having enhanced water-resisting property is implemented by the formation of a silicone resin-impregnated within-the-surface insulation layer 30 inside the varistor 1, with which multilayer varistor the peeling-off at the edge of external electrode 3 is also prevented by the formation of an outside-the-surface insulation layer 31, and the external electrode 3 does not ill-affect plating (26) and other post processes.

Now in the following, description will be made on some of the noticeable items regarding a multilayer varistor according to the present embodiment and its manufacturing method.

Referring to FIG. 1, by forming an outside-the-surface insulation layer 31 so as it covers the edge of external electrodes 3 formed at the ends of varistor 1 covering a part of the side surface, the sneaking of plating liquid, water etc. into inside of varistor 1 through the boundary between external electrode 3 and varistor 1 is prevented.

As an outside-the-surface insulation layer 31 and a within-the-surface insulation layer 30 have glossy surface, whether or not the within-the-surface insulation layer 30 and the outside-the-surface insulation layer 31 are formed can be visually identified by inspecting the surface of a multilayer varistor. This makes the selection work easier.

Although silicone resin has been exemplified as the insulation material for forming the outside-the-surface insulation layer 31 and the within-the-surface insulation layer 30, other resins may of course be used provided that they satisfy a certain heat resistivity, insulating property, water-repellent property, and low water-absorbing property; either one, or more than one, of epoxy resin, acrylic resin, polybutadiene resin, phenolic resin, etc. may be used for the purpose, besides the silicone resin.

Instead of the resin, or in mixture with the resin, at least one kind of metal alkoxide selected from the group of silicon, titanium, aluminium, zirconium, yttrium and magnesium may be used to obtain a same effect.

When the metal alkoxide is used, the impregnating solution is made with alcohol or other such solvents that dissolve metal alkoxide.

The within-the-surface insulation layer 30 has preferably a greatest possible thickness in so far as the characteristics of a multilayer varistor is not affected, at the same time the thinnest part of the within-the-surface insulation layer 30 of silicone resin after curing is preferably equal to or thicker than 10 $\mu$m. This is adjustable through the selection of the viscosity of silicone varnish 5, the rate of solvent and the pressurizing force.

The effect of pressurizing is enhanced by providing a state where the pressure is lower than the normal atmospheric pressure prior to the step of pressurizing for impregnation of silicone varnish 5 into varistor 1.

Besides $SiO_2$ exemplified as the powder inert to silicone varnish 5, other powders may also be used provided that they do not react with the impregnation solution to be impregnated into varistor 1; either one, or a mixture, of $ZrO_2$, $Al_2O_3$, $MgO$ may serve a same purpose.

A harder outside-the-surface insulation layer 31 is formed by thoroughly removing a solvent contained in silicone varnish 5 impregnated into varistor 1 by heating, prior to curing, at a temperature lower than boiling point.

The moisture-resisting property may be improved further by repeating the process steps from the immersion in silicone varnish 5 through the surface grinding for plural times, preferably twice. By so doing, the silicone resin is impregnated further into inside of varistor 1.

It is preferred that the edge of body has a curved shape. This shape alleviates the concentration of stress to one part of external electrode 3 when removing organic substance on external electrode 3 by grinding.

Although in the present embodiment a multilayer varistor using strontium titanium oxide as the main component is exemplified, the same effects are implementable also with a multilayer varistor using zinc oxide as the main component, as well as ceramic thermistors, capacitors, resistors and other electronic components in general. Not only in the multilayer type electronic components, the present invention implements the same effects in electronic components of any shapes, for example a disk shape electronic component.

Industrial Applicability

The insulation layer formed by impregnation into inside of the surface prevents deterioration of the moisture-resisting property, and the insulation layer formed on the surface enhances the strength of electrode preventing the peeling-off at the edge of electrode. Furthermore, this contributes to prevent the sneaking of moisture etc. into the inside through the edge of electrode. The moisture-resisting property is enhanced a step further.

What is claimed is:

1. A method of manufacturing an electronic component comprising the steps of:

forming at least a pair of electrodes on the surface of a body at a specified clearance;

contacting the surface of said body with an impregnating solution containing at least an organic substance for covering the surface of said body with said impregnating solution wherein a portion of said impregnating solution is impregnated into said body;

removing a part of the impregnating solution covering the surface of said body;

hardening the organic substance contained in said impregnating solution such that at least a part of said portion of said impregnating solution is separated out of said body and forms an outer surface insulating layer that covers at least a portion of said body, thereby forming the outer surface insulating layer and an inner surface insulating layer simultaneously; and removing the hardened organic substance on the surface of the pair of electrodes by grinding so that ends of the pair of the electrodes are covered with the hardened organic substance.

2. A method of manufacturing an electronic component of claim 1, wherein the step of contacting the body with an impregnating solution is repeated.

3. A method of manufacturing an electronic component of claim 1, wherein the organic substance contains at least one selected from the group consisting of metal alkoxide and resin.

4. A method of manufacturing an electronic component of claim 1, wherein the organic substance contains metal alkoxide, the metal alkoxide comprising at least one selected from the group consisting of silicon alkoxide, titanium alkoxide, aluminium alkoxide, zirconium alkoxide, yttrium alkoxide and magnesium alkoxide.

5. A method of manufacturing an electronic component of claim 1, wherein the organic substance contains resin, the resin being at least one selected from the group consisting of silicone resin, epoxy resin, acrylic resin, polybutadiene resin and phenolic resin.

6. A method of manufacturing an electronic component of claim 1, wherein the body is pressurized while being contacted with an impregnating solution.

7. A method of manufacturing an electronic component of claim 1, wherein the organic substance on the surface of the body is removed by at least one means of centrifugal separation, washing with an organics-dissolving liquid, and contacting with a powder inert to impregnating solution.

8. A method of manufacturing an electronic component of claim 7, wherein the powder contains at least one selected from the group consisting of $SiO_2$, $ZrO_2$, $Al_2O_3$ and MgO.

9. A method of manufacturing an electronic component of claim 1, wherein the grinding is conducted at least by moving a container in which the body and a liquid are contained.

10. A method of manufacturing an electronic component of claim 1, wherein the pair of electrodes is formed after the edge of the body is made to have a curved shape.

* * * * *